US012683644B2

(12) United States Patent　　　　(10) Patent No.: US 12,683,644 B2
Mitra et al.　　　　　　　　　　　　(45) Date of Patent: Jul. 14, 2026

(54) USING PRIOR KNOWLEDGE TO CALIBRATE A RADIO FREQUENCY FRONTEND

(71) Applicant: Dell Products L.P., Round Rock, TX (US)

(72) Inventors: Jeebak Mitra, Ottawa (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 18/364,440

(22) Filed: Aug. 2, 2023

(65) Prior Publication Data

US 2025/0047318 A1　　Feb. 6, 2025

(51) Int. Cl.
*H04B 1/40*　　　(2015.01)
*H04B 17/11*　　(2015.01)
*H04B 17/21*　　(2015.01)
*H04B 17/391*　(2015.01)

(52) U.S. Cl.
CPC ............... *H04B 1/40* (2013.01); *H04B 17/11* (2015.01); *H04B 17/21* (2015.01); *H04B 17/3913* (2015.01)

(58) Field of Classification Search
CPC .......... H04B 1/40; H04B 17/11; H04B 17/21; H04B 17/3913
See application file for complete search history.

(56) References Cited

U.S. PATENT DOCUMENTS

| | | | |
|---|---|---|---|
| 12,245,052 B2 * | 3/2025 | Narasimha Swamy | ..................... H04L 41/145 |
| 12,258,045 B2 | 3/2025 | Ucar | |
| 12,566,249 B2 | 3/2026 | Srikrishnan | |
| 2018/0101803 A1 | 4/2018 | Tiwari | |
| 2019/0218954 A1 | 7/2019 | Ragaller | |
| 2019/0319659 A1 * | 10/2019 | Calabro | ................... G06N 3/08 |
| 2019/0340534 A1 | 11/2019 | McMahan | |
| 2021/0406677 A1 | 12/2021 | Wang | |

(Continued)

OTHER PUBLICATIONS

Pan, S.J.; Yang, Q. "A Survey on Transfer Learning". IEEE Transactions on Knowledge and Data Engineering, vol. 22, No. 10, Oct. 2010, 15 pages.

(Continued)

*Primary Examiner* — Md K Talukder

(74) *Attorney, Agent, or Firm* — Amin, Turocy & Watson, LLP

(57) ABSTRACT

A method can comprise, as part of initially deploying a second radio frequency (RF) transceiver, transferring, by a system, a core model to the second RF transceiver, the core model having been trained based on a training process comprising training an artificial intelligence model for a first RF transceiver, based on first data that is measured for the first RF transceiver. The method can further comprise applying, by the system, transfer learning on the core model at the second RF transceiver based on second data that is measured for the second RF transceiver, to produce a trained model. The method can further comprise calibrating, by the system, the second RF transceiver based on an output of the trained model to produce a calibrated second RF transceiver. The method can further comprise transmitting, by the system, RF information via the calibrated second RF transceiver.

20 Claims, 11 Drawing Sheets

100

(56) References Cited

U.S. PATENT DOCUMENTS

| | | | | |
|---|---|---|---|---|
| 2022/0343161 | A1* | 10/2022 | Restuccia | G06N 3/09 |
| 2022/0383118 | A1* | 12/2022 | Nair | G06N 3/0455 |
| 2023/0036702 | A1 | 2/2023 | Reisser | |
| 2023/0180014 | A1* | 6/2023 | Storn | H04B 1/0003 |
| | | | | 455/454 |
| 2023/0417870 | A1 | 12/2023 | Srikrishnan | |
| 2024/0044961 | A1* | 2/2024 | Juluri | G01R 29/08 |
| 2024/0111903 | A1 | 4/2024 | Moran | |
| 2024/0161012 | A1* | 5/2024 | Pezeshki | G06N 3/098 |
| 2024/0186106 | A1 | 6/2024 | Wang | |
| 2024/0202542 | A1* | 6/2024 | Lindbom | G06N 3/088 |
| 2024/0305388 | A1 | 9/2024 | Peng | |
| 2024/0340660 | A1* | 10/2024 | Balevi | H04W 24/02 |
| 2024/0346327 | A1 | 10/2024 | Wang | |
| 2024/0346376 | A1 | 10/2024 | Liu | |
| 2025/0005375 | A1 | 1/2025 | Li | |
| 2025/0005443 | A1 | 1/2025 | Mezghani | |
| 2025/0047318 | A1* | 2/2025 | Mitra | H04B 17/21 |
| 2025/0168659 | A1 | 5/2025 | Kim | |
| 2025/0293943 | A1 | 9/2025 | Kela | |

OTHER PUBLICATIONS

Zhuang, F.; Qi, Z.; Duan, K.; Xi, D.; Zhu, Y.; Zhu, H.; Xiong, H.; He, Q. "A comprehensive survey on transfer learning". arXiv preprint [https://arxiv.org/pdf/1911.02685], 2020, 31 pages.

Kaichao You, Yong Liu, Mingsheng Long, and Jianmin Wang. "LogME: Practical Assessment of Pre-trained Models for Transfer Learning". arXiv preprint [https://arxiv.org/pdf/2102.11005], 2021, 13 pages.

X. Hu et al., "Convolutional Neural Network for Behavioral Modeling and Predistortion of Wideband Power Amplifiers," IEEE Trans. Neural Netw. Learn. Syst., vol. 33, No. 8, pp. 3923-3937, Aug. 2022, 15 pages.

L. J. Wong, W. H. Clark IV, B. Flowers, R. M. Buehrer, A. J. Michaels, and W. C. Headley, "The RFML Ecosystem: A Look at the Unique Challenges of Applying Deep Learning to Radio Frequency Applications." arXiv preprint [https://arxiv.org/pdf/2010.00432], 2020, 19 pages.

Mitra et al. "In-Field Radio Frequency Impairment Compensation" U.S. Appl. No. 18/457,999, filed Aug. 29, 2023, 48 pages.

Office Action mailed Mar. 6, 2026 for U.S. Appl. No. 18/457,999, 35 pages.

* cited by examiner

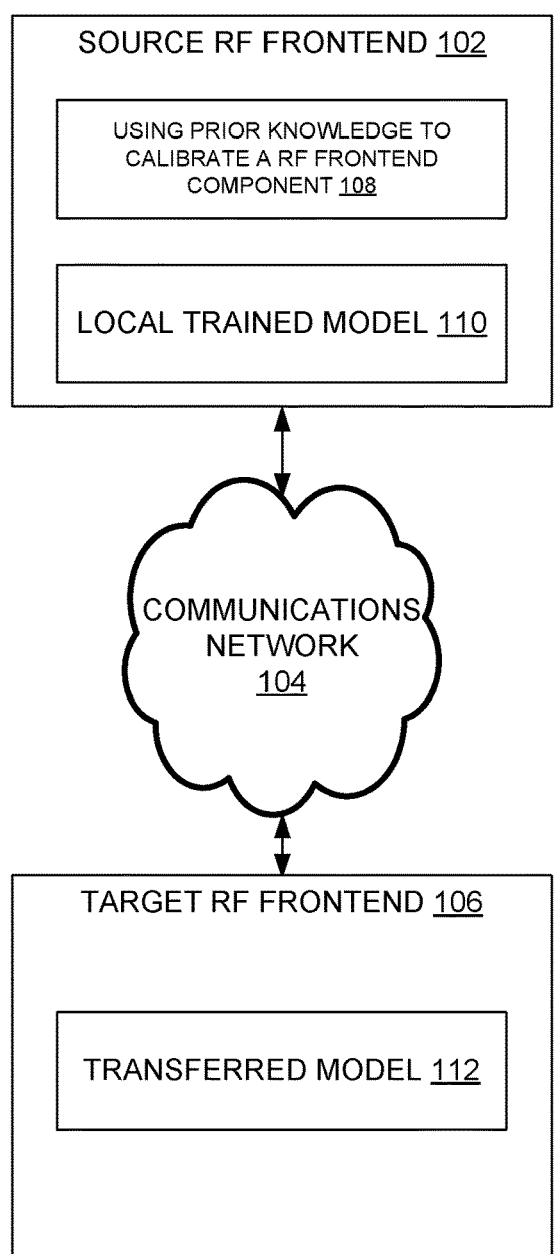
FIG. 1

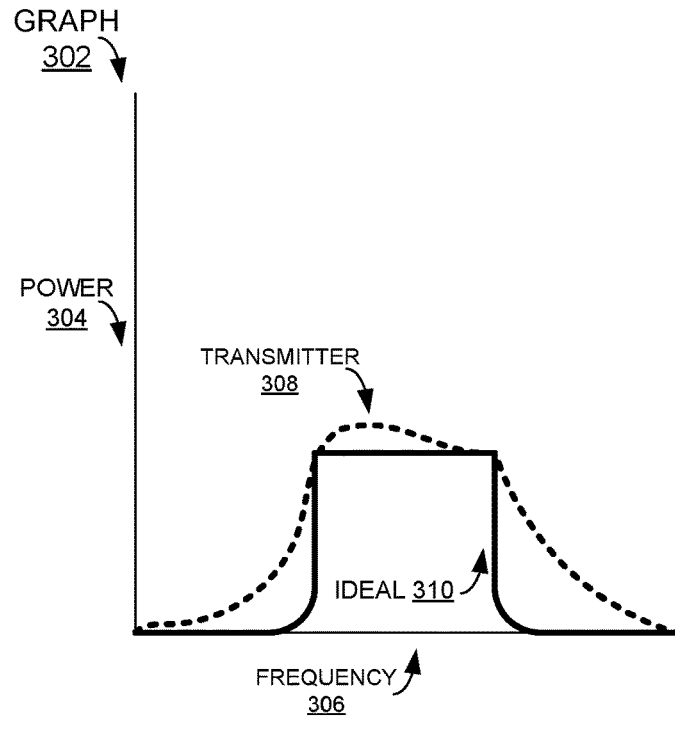
FIG. 3

800

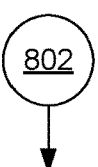

AS PART OF INITIALLY DEPLOYING A SECOND RADIO FREQUENCY TRANSCEIVER, TRANSFERRING A CORE MODEL TO THE SECOND RADIO FREQUENCY TRANSCEIVER, THE CORE MODEL HAVING BEEN TRAINED BASED ON A TRAINING PROCESS COMPRISING TRAINING AN ARTIFICIAL INTELLIGENCE MODEL FOR A FIRST RADIO FREQUENCY TRANSCEIVER, BASED ON FIRST DATA THAT IS MEASURED FOR THE FIRST RADIO FREQUENCY TRANSCEIVER, WHEREIN THE CORE MODEL IDENTIFIES A NUMBER OF LAYERS AND RESPECTIVE NUMBERS OF NEURONS FOR RESPECTIVE LAYERS OF THE NUMBER OF LAYERS, AND WHEREIN THE CORE MODEL IS TRANSFERRED INDEPENDENT OF IDENTIFYING INTERCONNECTIONS AND COEFFICIENTS 804

APPLYING TRANSFER LEARNING ON THE CORE MODEL AT THE SECOND RADIO FREQUENCY TRANSCEIVER BASED ON SECOND DATA THAT IS MEASURED FOR THE SECOND RADIO FREQUENCY TRANSCEIVER, TO PRODUCE A TRAINED MODEL, WHEREIN THE TRAINED MODEL COMPRISES THE NUMBER OF LAYERS, THE RESPECTIVE NUMBERS OF NEURONS FOR RESPECTIVE LAYERS OF THE NUMBER OF LAYERS, THE INTERCONNECTIONS, AND THE COEFFICIENTS 806

CALIBRATING THE SECOND RADIO FREQUENCY TRANSCEIVER BASED ON AN OUTPUT OF THE TRAINED MODEL TO PRODUCE A CALIBRATED SECOND RADIO FREQUENCY TRANSCEIVER 808

TRANSMITTING RADIO FREQUENCY INFORMATION VIA THE CALIBRATED SECOND RADIO FREQUENCY TRANSCEIVER 810

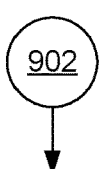

902

AS PART OF INITIALLY DEPLOYING A SECOND TRANSCEIVER, TRANSFERRING A CORE MODEL TO THE SECOND TRANSCEIVER, THE CORE MODEL HAVING BEEN TRAINED, BASED ON FIRST DATA THAT IS MEASURED FOR A FIRST TRANSCEIVER, USING AN ARTIFICIAL INTELLIGENCE MODEL FOR THE FIRST TRANSCEIVER, WHEREIN THE CORE MODEL IDENTIFIES A NUMBER OF LAYERS AND RESPECTIVE NUMBERS OF NEURONS FOR RESPECTIVE LAYERS OF THE NUMBER OF LAYERS 904

PERFORMING TRANSFER LEARNING ON THE CORE MODEL AT THE SECOND TRANSCEIVER BASED ON SECOND DATA THAT IS MEASURED FOR THE SECOND TRANSCEIVER, TO PRODUCE A TRAINED MODEL 906

CALIBRATING THE SECOND TRANSCEIVER BASED ON AN OUTPUT OF THE TRAINED MODEL TO PRODUCE A CALIBRATED SECOND TRANSCEIVER 908

TRANSMITTING INFORMATION VIA THE CALIBRATED SECOND TRANSCEIVER 910

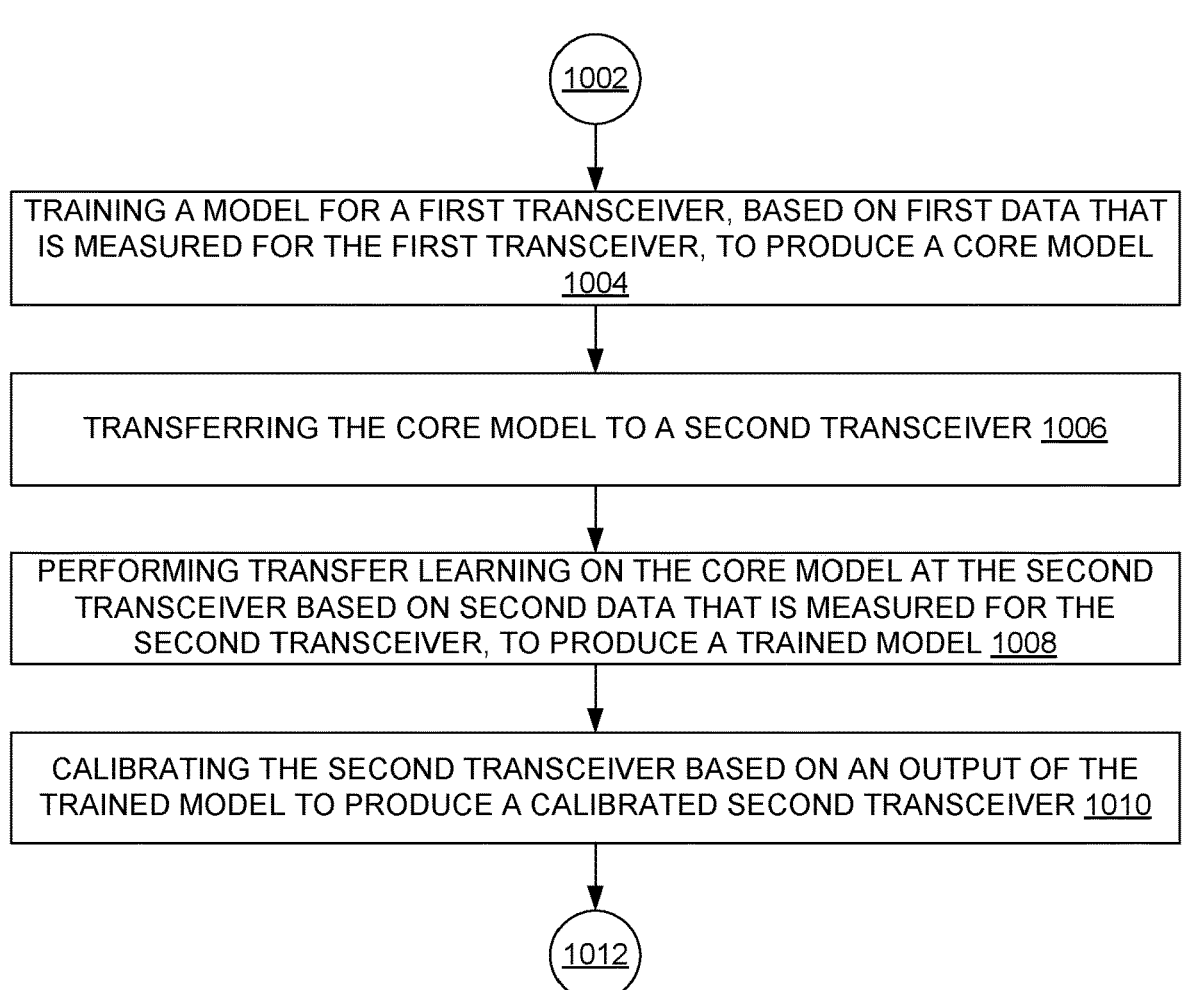

1000

1002

TRAINING A MODEL FOR A FIRST TRANSCEIVER, BASED ON FIRST DATA THAT IS MEASURED FOR THE FIRST TRANSCEIVER, TO PRODUCE A CORE MODEL 1004

TRANSFERRING THE CORE MODEL TO A SECOND TRANSCEIVER 1006

PERFORMING TRANSFER LEARNING ON THE CORE MODEL AT THE SECOND TRANSCEIVER BASED ON SECOND DATA THAT IS MEASURED FOR THE SECOND TRANSCEIVER, TO PRODUCE A TRAINED MODEL 1008

CALIBRATING THE SECOND TRANSCEIVER BASED ON AN OUTPUT OF THE TRAINED MODEL TO PRODUCE A CALIBRATED SECOND TRANSCEIVER 1010

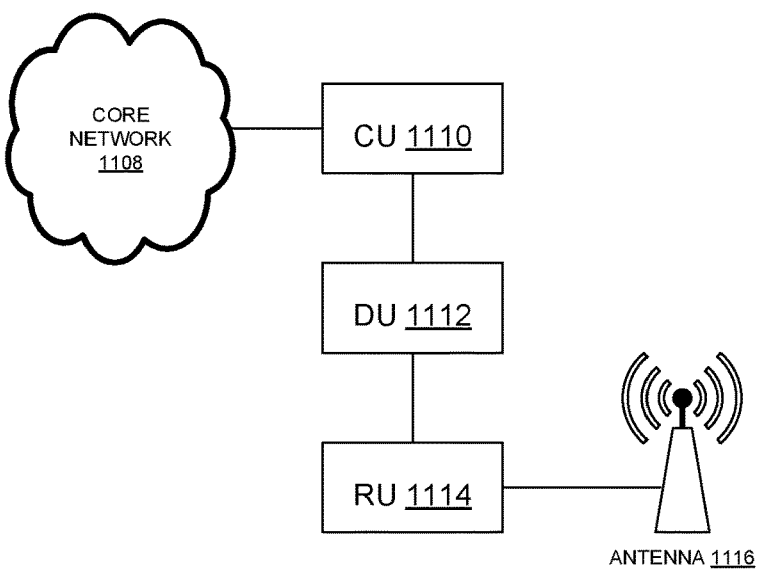
FIG. 11

USING PRIOR KNOWLEDGE TO CALIBRATE A RADIO FREQUENCY FRONTEND

BACKGROUND

A base station can communicate with user equipment to facilitate mobile communications, or cellular network communications. In doing so, a radio frequency (RF) frontend of a base station can be calibrated to improve performance.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method can comprise, as part of initially deploying a second radio frequency transceiver, transferring, by a system, a core model to the second radio frequency transceiver, the core model having been trained based on a training process comprising training an artificial intelligence model for a first radio frequency transceiver, based on first data that is measured for the first radio frequency transceiver, wherein the core model identifies a number of layers and respective numbers of neurons for respective layers of the number of layers, and wherein the core model is transferred independent of identifying interconnections and coefficients. The method can further comprise applying, by the system, transfer learning on the core model at the second radio frequency transceiver based on second data that is measured for the second radio frequency transceiver, to produce a trained model, wherein the trained model comprises the number of layers, the respective numbers of neurons for respective layers of the number of layers, the interconnections, and the coefficients. The method can further comprise calibrating, by the system, the second radio frequency transceiver based on an output of the trained model to produce a calibrated second radio frequency transceiver. The method can further comprise transmitting, by the system, radio frequency information via the calibrated second radio frequency transceiver.

An example system can operate as follows. The system can, as part of initially deploying a second transceiver, transfer a core model to the second transceiver, the core model having been trained, based on first data that is measured for a first transceiver, using an artificial intelligence model for the first transceiver, wherein the core model identifies a number of layers and respective numbers of neurons for respective layers of the number of layers. The system can perform transfer learning on the core model at the second transceiver based on second data that is measured for the second transceiver, to produce a trained model; calibrating the second transceiver based on an output of the trained model to produce a calibrated second transceiver. The system can transmit information via the calibrated second transceiver.

An example non-transitory computer-readable medium can comprise instructions that, in response to execution, cause a system comprising a processor to perform operations. These operations can comprise training a model for a first transceiver, based on first data that is measured for the first transceiver, to produce a core model. These operations can further comprise transferring the core model to a second transceiver. These operations can further comprise performing transfer learning on the core model at the second transceiver based on second data that is measured for the second transceiver, to produce a trained model. These operations can further comprise calibrating the second transceiver based on an output of the trained model to produce a calibrated second transceiver.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate the use of prior knowledge to calibrate a RF frontend, in accordance with an embodiment of this disclosure;

FIG. 3 illustrates an example signal distortion due to power amplifier (PA) transfer characteristics in a real radio transmission system and one that can be mitigated through use of prior knowledge to calibrate a RF frontend in base stations, in accordance with an embodiment of this disclosure;

FIG. 8 illustrates an example process flow that can facilitate the use of prior knowledge to calibrate a RF frontend in base stations, in accordance with an embodiment of this disclosure;

FIG. 9 illustrates another example process flow that can facilitate the use of prior knowledge to calibrate a RF frontend in base stations, in accordance with an embodiment of this disclosure;

FIG. 10 illustrates another example process flow that can facilitate the use of prior knowledge to calibrate a RF frontend in base stations, in accordance with an embodiment of this disclosure;

FIG. 11 illustrates an example block diagram of a computer operable to execute an embodiment of this disclosure.

DETAILED DESCRIPTION

Overview

Figure 2:
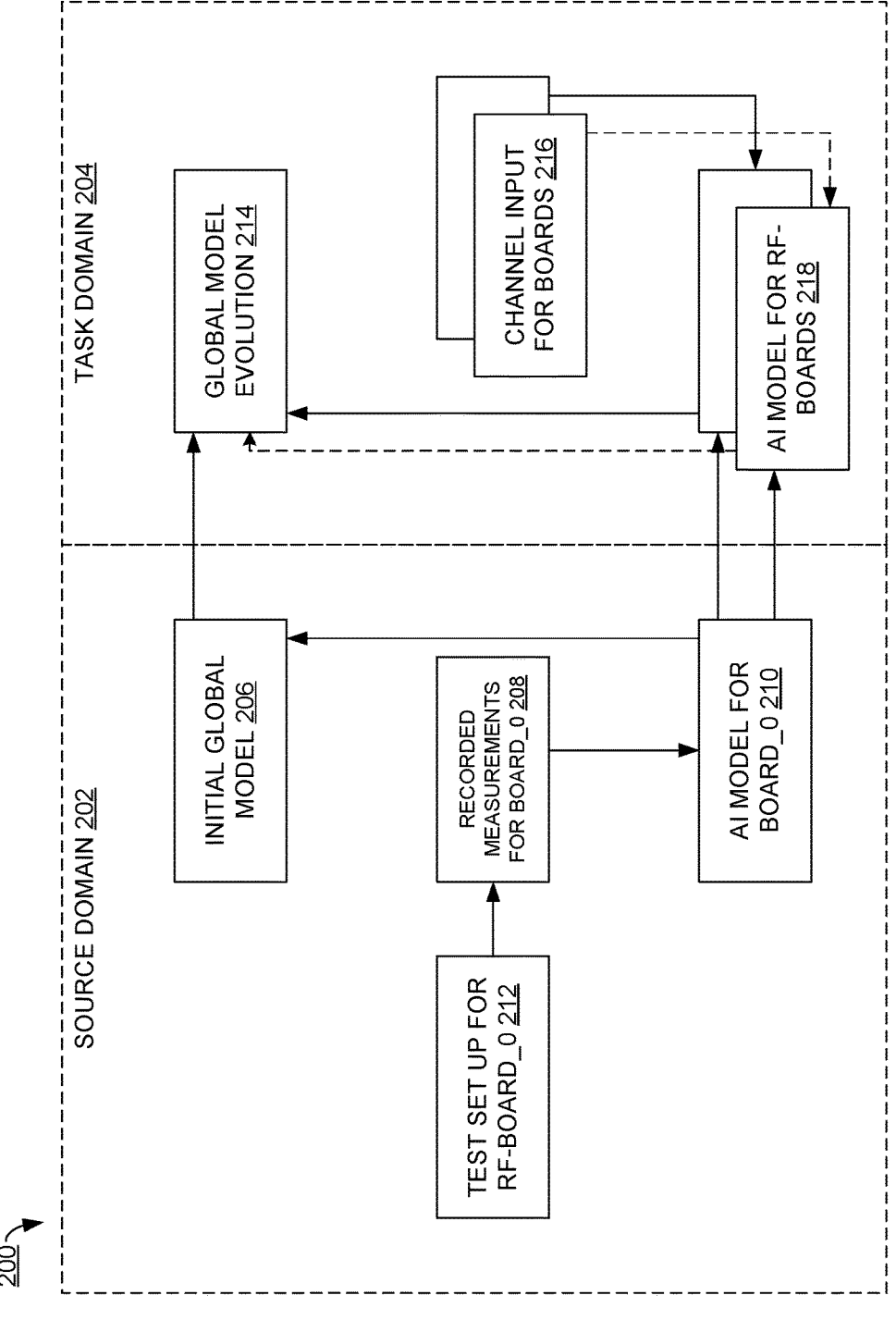
FIG. 2 illustrates an example system architecture for framework for using transfer learning for an artificial intelligence (AI) model transfer for RF cards that can facilitate the use of prior knowledge to calibrate a RF frontend in base stations, in accordance with an embodiment of this disclosure.

Examples described herein can refer to optimizing things, such as base station calibration. It can be appreciated that the present techniques can be applied to improving similar metrics, even though the improvement might not be an optimal outcome. Similarly, where examples describe superlatives, such as maximizing a metric, it can be appreciated that there can be examples where an improvement or increase in that metric occurs.

An application of artificial intelligence/machine learning (AI/ML) techniques to wireless communications can have gained popularity due to an ability to model and learn various statistical distributions describing both a wireless signal (where it can be that it does not have a closed form mathematical representation for real world channels) and behavior of various hardware blocks within wireless base station transmission equipments that can also be non-linear. However, while some prior approaches have had varied levels of success in applying these techniques to a baseband signal processing modules, the application of these techniques for radio frequency (RF) modules has been quite limited. On the other hand, self-calibration for devices can be an important ability to achieve the goal of autonomous network provisioning and operation and reduce capital expenditures (CAPEX) and operating expenditures (OPEX). In this regard, optimal tuning of various RF modules or radio units (RUs) can be done in an automated fashion by running various calibration loops and is typically performed at a factory when the device is powered and before deploying to the field. As such minimizing manual intervention for such procedures can save several person-hours (and therefore cost), and can remove a possibility of human error. An increasingly important way of facilitating self-calibration features can involve employing AI/ML techniques. The present techniques can provide frameworks and approaches that facilitate this.

It can be that there has been increasing interest in the application of ML techniques, such deep learning (DL), to wireless communications. AI/ML techniques can be considered as a transformative technology in the implementation of the fifth generation (5G) new radio (NR) standard, and can be expected to be a fundamental basis for sixth generation (6G) networks. Prior approaches in this area generally use supervised learning techniques, e.g., training from labeled data whereby the models can be initialized using a random set of weights and progressively updated through closed loop feedback. While the results can be impressive, in some examples, it can be that inherent assumptions in such applications can be an availability of large data sets of labeled training data, which is representative of expected environments. For wireless communication, this can end up being the RF environments in which the RUs will work once deployed, including RF hardware variations and various channel effects. However, it can be that this assumption regarding close to true operational environment does not hold due to a variability of wireless operational environments. In fact, it can be that prior art in the area has shown limited ability to generalize to new hardware effects and channel conditions as performance can be seen to degrade rapidly under deviations. Customizing and innovating deep learning architectures and techniques for application in the RF domain using domain specific knowledge, therefore, can continue to be a challenge. One of the reasons for this can be that several of the techniques have been developed in domains such as image processing, computer vision (CV) and natural language processing (NLP), where access to large, labeled data sets can be less of an issue. Additionally, prior approaches delving into application of AI/ML techniques to the RF domain can have been largely restricted to areas such as cognitive radio (sensing), automatic modulation classification, and the like. A scope of application of AI/ML techniques can be extended to more fundamental operations in the RF domain such as signal pre-conditioning in both transmit and receive chains. Furthermore, for capturing a value of these new approaches that can tend to be agnostic to true statistical distributions of the signal, approaches that allow their application to volume production and further commercialization can be beneficial. This can be important to establish an economic benefit from the significant efforts and advances made in this area.

It can be that application of AI/ML methods to RF processing has been scant due to several issues related to the operating environment—e.g., non-stationary and highly frequency selective channels along with pressure, voltage, temperature (PVT) variation in RF front-ends of base station and fast times-scales in which RF operations occur. When deploying on several thousands of wireless network equipment, it can be that an AI/ML model developed from one set of transceiver measurements is sub-optimal for a vast majority of RF frontends due to process variations commonly seen in volume production. Self-calibration using ML techniques can therefore be challenging for RF volume production and can yield significant dividends if solved effectively, that is, in a computationally cheap manner.

For base station (BS) functionality to maintain optimal levels, high quality RF components and design can be utilized so that the transmission losses can be minimized. Furthermore, industry alliances such as O-RAN, advocating disaggregated networks provide the opportunity to use base station elements implementing various functionalities of the protocol stack, such as RUs, distributed units (DU) and centralized units (CU), from different vendors and potentially mix-and-match units from any vendor as long as they meet inter-operability specifications.

However, for a vendor neutral O-RAN adoption to be competitive from a performance perspective, quality of transmission can need to be maintained in all cases. Additionally, RF components can be liable to degradation over time due to several factors such as overuse, inadequate maintenance, aging, environmental factors, etc. An aspect of maintenance, and thus ensuring optimal performance, can be identifying a source of the observed distortion so that degradation from such distortion can be adequately corrected by:

Operating the RF component in a more efficient mode, and/or

Proactively replacing the RF part to avoid traffic disruptions.

ML techniques can be used to address these issues, as well, by considering requisite parameter updates for the specific devices. It can be that prior approaches involve developing a model considering only one or two transceiver devices that can represent a marginal representation of the RF environment where the AI/ML models will operate. Therefore, an approach to easily adapt AI/ML models and make them work universally on RF frontends developed for the same application can continue to be an objective.

Conventional ML approaches can be implicitly trained for a specific scenario, and the real-world application can be expected to be some small variations of this with added noise. Wireless environments, however, can be subject to variations that can make the new scenarios differ significantly from the previous ones due to several reasons such as:

changes in the channel itself,

RF frontend behavioral variation, changes in users' traffic demands, etc.

Additionally, performances of AI/ML techniques can rely on an availability of sufficient training data, but acquiring enough data can be costly and time-consuming. In fact, DL approaches can require a long training time, which can make them impractical for many latency-sensitive applications.

A problem with prior approaches is computational burden. It can be that many wireless devices are constrained by their limited computing capacity, and thus, are unable to train high-complexity ML models. Furthermore, in environments where distributed processing is inherent, training and initialization of ML models can pose a significant challenge as it can be that the computing platform is not able to localize the training of the models without increasing complexity significantly. However, in many instances, while there can be many nodes implementing the model, the dynamics (statistics) of the underlying process that the model is trying to learn can tend to be the same or similar. These kind of application scenarios can be amenable to use techniques that are captured under the domain of transfer learning (TL). TL techniques can use prior knowledge obtained from a source domain/task to improve performance on a similar target domain/task. Nonetheless, it can be that, since the dynamics of each use case are different, there can be a need for carefully crafting the specific TL technique that would be applicable, and furthermore to adapt that technique to the specifics of the application at hand. As described below, a use of various radio units with their own individual RF frontends, many of which can be connected to the same DU or further up a chain, controlled by the same CU, can have the opportunity to use a combination of techniques from the domains of transfer learning to enhance to overall performance and training times for the relevant AI/ML models. These AI/ML models can further be shown by way of example, as described below, to be used for impairment mitigation and other aspects.

Another problem with prior techniques can relate to centralized processing. Centralized ML systems can use powerful servers for processing and training. However, they can require huge amounts of data to be transferred from telemetry points on edge RF devices to the servers over links with limited bandwidth. In addition to communication overhead, there can be a risk that a model update can have a high latency that is unacceptable for the intended application. Consequently, these aspects can significantly impact the ML techniques' performances and hinder their applicability. The present techniques can be implemented to address this problem.

The present techniques can be implemented to adapt ML techniques to deal with a nonstationary RF environment. An application of AI/ML to RF can be a random initialization of the initial weights to be used by the AI/ML model followed by supervised learning techniques from labeled data that is representative of anticipated observations once deployed, including RF hardware variations and channel effects. When this assumption does not hold, it can be that prior approaches have shown limited ability to generalize to new hardware effects and channel conditions. The present techniques can consider operations such as RF transmit pre-equalization and signal pre-conditioning using a set of weights obtained through model training and a deep learning neural network. Model architecture exploration can be done on a set of 'M' RF boards and the application of the AI/ML model for self-calibration to enable volume production of 'N' RF frontends where M<<N. Here, it can be that the smallest value for M is 1. The present techniques can be implemented to facilitate architectures that comprise aspects such as establishing the number of layers and required number of nodes within each layer of the deep neural network (DNN).

An initial model can be trained based on RF measurements of M RF cards (M>>1), and since it can be that there is not a guarantee that another transceiver-receiver (Tx-Rx) pair will exhibit similar behavior (bandwidth, transfer characteristics such as S21 behavior, high frequency characteristics, etc.), transfer learning techniques can be implemented to make use of it to initialize pre-compensation for other RF cards.

In particular, domain adaptation techniques can be used on these other RF devices to make the model applicable to those platforms. Two domains can be said to be different when they are different in at least one of their constituent components, such as the input space, the output space, or the probability density function. More specifically, a focus can be on ways to deal with data sampled from different distributions, thus compensating for their mismatch. This applies very directly to the case when measurements are obtained from different RF boards but are targeting the characterization of same underlying calibrated parameter or impairment.

The present techniques can be implemented to facilitate the following. A computationally optimized AI/ML model can be initiated for RF transceiver specific optimization, whereby the requirement for local training for all boards deployed in field can be avoided by using transfer learning along with platform adaptation based on autonomous self-calibration features of a radio unit. A cost of collecting data can be reduced, as well as a cost of training AI/ML models for application to RF optimization such as transmit output power, energy efficiency, skew and frequency offset (FO) mitigation, etc.

Example Architectures

FIG. 1 illustrates an example system architecture 100 that can facilitate the use of prior knowledge to calibrate a RF frontend in base stations in accordance with an embodiment of this disclosure.

System architecture 100 comprises source RF frontend 102, communications network 104, and target RF frontend 106. In turn, source RF frontend 102 comprises use of prior knowledge to calibrate a RF frontend component 108, and local trained model 110. And target RF frontend 106 comprises transferred model 112.

Communications network 104 can comprise infrastructure used for transferring data. Each of source RF frontend 102 and/or target RF frontend 106 can generally comprise circuitry of a radio disposed between a radio's antenna and its baseband.

As part of calibrating a frontend, source RF frontend 102 can use prior knowledge which may include measurement that are done to characterize and input-output relationship of the RF front-end circuitry to calibrate use of prior knowledge to calibrate a RF frontend component 108, and train local trained model 110 locally, i.e., using data pertaining to that RF board only. After use of prior knowledge for calibration of a RF frontend component 108 trains local trained model 110, transfer learning can be used to transfer local trained model 110 to target RF frontend 106 as transferred model 112. In some examples, this transferring can comprise transferring a core model of a number of layers having a number of neurons, without transferring connections between the neurons or weights for those connections.

Target RF frontend 106 can use transferred model 112 to perform self-calibration.

In some examples, use of prior knowledge to calibrate an RF frontend component 108 can implement part(s) of the process flows of FIGS. 8-10 to implement the use of prior knowledge to calibrate a RF frontend in base stations.

It can be appreciated that system architecture 100 is one example system architecture for the use of prior knowledge to calibrate a RF frontend in base stations, and that there can be other system architectures that can facilitate the use of prior knowledge to calibrate a RF frontend in base stations.

FIG. 2 illustrates an example system architecture 200 for framework for using transfer learning for an AI model transfer for RF cards that can facilitate use of prior knowledge to calibrate a RF frontend in base stations, in accordance with an embodiment of this disclosure. In some examples, part(s) of system architecture 200 can be used to implement part(s) of system architecture 100 of FIG. 1 to facilitate the use of prior knowledge to calibrate an RF frontend in base stations.

System architecture 200 can be used to facilitate transfer learning for model initialization for each O-RU such that the system can be rendered in an optimal state prior to carrying data traffic. System architecture 200 comprises source domain 202, task domain 204, initial global model 206 (initiated from RF-Board_0), recorded measurements for Board_0 208, AI model for Board_0 210, test set up for RF-Board_0 212, global model evolution 214, channel input for boards 216, and AI model for RF-Boards 218.

System architecture 200 can facilitate the following for volume produced 'N' RF modules:

Model initiation can be facilitated through transfer learning for RF modules, with an initial model training and an initial NN architecture that consider, at most, 'M' RF transceivers, where M=1, 2, . . . , K and K<<N.

Distributed and federal learning can be performed in-field to maintain a current (in time epoch) global model that can be also initiated by training on a small set of boards.

The following is nomenclature that can be used generally in the area of transfer learning. The domain is denoted by D={X, P(X)}, where X is input data and P(X) is its marginal probability distribution. Additionally, $$X = \{x_1, x_2, \dots, x_n\} \in X \text{ denotes the input space,}$$

and the task is given by $$T = \{Y, P(Y|X)\}$$

which comprises a label space Y and the conditional probability distribution P(Y|X). In this disclosure, it can be that the domain constitutes the RF hardware (characteristics) and the wireless channel environment between the transmitter and receiver chains. Traditional supervised ML can assume that the model trained on the source domain DS and Task TS can be directly applied to the target domain without modification. In examples, for RF applications, this can be unlikely.

Generating a training data set can be implemented as follows. For a RF domain, obtaining a curated data set using raw in-phase quadrature (I/Q) signaling can be a challenge. As described herein, the data set can be generated keeping in mind its use for transfer learning for model initialization in RF transmit boards with varied characteristics. For training in the source domain, multiple data sets can be generated by varying several (RF) platform specific parameters such as FO, IQ skew values (within tolerance specification), etc., while keeping system related parameters constant such as signal bandwidth, modulation order, and calibrated power amplifier (PA) bias. Furthermore, these data sets can be then varied within the target operational signal-to-noise ratio (SNR) with a +/−5% variation to account for variation in thermal noise.

In some examples, evaluation of transfer accuracy can be implemented as follows. In order to gauge the performance of the RF domain adaptation a logarithm of maximum evidence (LogME) can be utilized. Generally, LogME as a transferability metric can provide a measure of how well a source model will transfer to a target dataset, and can be evaluated without performing transfer learning, but by a single forward pass through the source model.

A LogME technique can be used to estimate a maximum value of label evidence given features extracted by pretrained models using a computationally efficient Bayesian algorithm. The pre-trained model can be used as a feature extractor, and the LogME score can be determined using the extracted features and ground truth labels of the target dataset. It can work well in un-supervised settings. Values can be computed to be between [−1, 1], with values closest to −1 indicating worst transferability and values closest to 1 indicating best transferability. Thus, a pre-trained model with high LogME value can be associated with good transfer performance.

It can be that TL has been successfully applied in fields like computer vision (CV) and natural language processing (NLP) as it can afford (a) reduced training time and (b) better performance in several cases. However, it can be that applying these concepts to a RF/wireless domain has not been pursued as the fundamental assumptions of stationarity and similarity that can be key to the successful application of these approaches does not translate to the wireless domain easily. Employing ML to volume produced RF systems through TL can be implemented as follows. As described herein, TL can be implemented for RF processing, where what is transferred is learned weights of the pre-processing NN architecture, along with the NN model. Transfer can be performed when RF boards are first powered up for calibration, where TL can be implemented at a modem bootup and calibration stage. Transfer of the initial model and parameters can be performed as part of initial bootup and memory contents, because it can be that communication bandwidth is not an issue.

It can be that TL according to the present techniques (RF adaptation) can be described using the formality of transductive TL whereby the task at the source and target are the same but their domains are different.

The present techniques can be implemented to facilitate learning from a small sample set. A reason that application of AI/ML approaches has faced obstacles in the RF domain can be that there can be several variations in wireless channel behavior. At the same, the behavior of RF frontend modules can be difficult to model accurately using deterministic models owing to aspects like non-linearity, time-variability, and dependence on signal characteristics itself. These aspects can make a RF domain one of the prime areas where NN based models can be used to model the statistical behavior of both the modules as well as the wireless signals. Such learning can sometimes require very large data sets, and the higher the dimensional or parametric dependency of the modeled impairment, the larger the data set can be. On the other hand, the use of transfer learning for RF tasks that can be of the same task domain can imply that the data set requirement can be significantly lower. TL can allow an initialization based on a task domain where a large data set can be produced. In the present examples, it can be the RF test board. This can provide an approach to reduce dependence on availability of labeled data for a wide multitude of RF environments to make AI/ML techniques useful for RF design in realistic environments.

The following examples can illustrate how the present techniques can be used for various stages of learning for use of AI/ML model for RF processing from initialization on one board to application of those learned models to various boards with similar functional requirement but inherent variations in characteristics due to manufacturing process variability.

An example of model initialization and transfer can relate to AI model development for self-optimization. Here, an AI model can be developed for a single transceiver setup by considering data that can be measured for characterization of this transceiver. Ordinarily, it can be assumed that sufficient data can be available for the given task for an NN based AI/ML model being developed for a single RF test board. The tasks can have varying objectives, and, in some examples, the tasks can be as follows.

An example of the task can be transmitter pre-equalization using a feed forward NN structure. It can be that RF transmission modules at the frontend exhibit frequency selective behavior in the sense that the overall transmission characteristics of the frontend modules exhibit band-limited transmission and, a frequency closer to the edges of the signal bandwidth exhibit greater level of attenuation than those closer to DC (0). Pre-compensation or pre-equalization of the transmitted signal can be required to send out the signal into the channel with the least amount of distortion. However, it can be difficult to precisely capture the transfer characteristics for wideband signals (which can be what is prevalent for 5G NR) owing to measurement inaccuracies and fundamental limits in the calibration techniques with finite frequency domain resolution, for example. In such cases, it can be that a DNN architecture shows superior compensation abilities.

FIG. 3 illustrates an example signal distortion 300 due to PA transfer characteristics in a real radio transmission system and one that can be mitigated through use of prior knowledge to calibrate a RF frontend in base stations, in accordance with an embodiment of this disclosure. In some examples, part(s) of signal distortion 300 can be used to implement part(s) of system architecture 100 of FIG. 1 to facilitate the use of prior knowledge to calibrate a RF frontend in base stations.

Signal distortion 300 comprises graph 302, power 304 (y-axis), frequency 306 (x-axis), transmitter 308, ideal 310, and the use of prior knowledge to calibrate a RF frontend in base stations component 312 (which can be similar to use of prior knowledge to calibrate a RF frontend component 108 of FIG. 1). Ideal 310 can illustrate an ideal curve that embodies a desired transmit bandwidth between two ends of the ideal curve.

Another example of a task can relate to digital pre-distortion using a DNN or long-short term memory (LSTM) structure to compensate for front-end distortion of the transmit signal. A component in a RF data path can be a PA that applies adequate gain to the analog transmit signal to feed the signal to the antenna with the target output power, for example 40 watts (W) for some macro base stations. However, as the PA can be a highly non-linear device (as shown in 302), then the transfer characteristics of the PA need to be compensated to send an RF signal from a base station with high fidelity.

Signal distortion 300 depicts distortion due to PA transfer characteristics. In transceivers, such distortion can be compensated in the digital domain by signal processing modules that can be implemented using filtering architectures and compensation coefficients or weights that can be pre-computed through a carefully calibrated process. These determinations need to be factory calibrated for each card due to process variations from one device to another and that can be time consuming. Alternatively, one can use a DNN architecture to model the overall signal distortion due to various RF components (including PA) as shown in system architecture 400.

Figure 4:
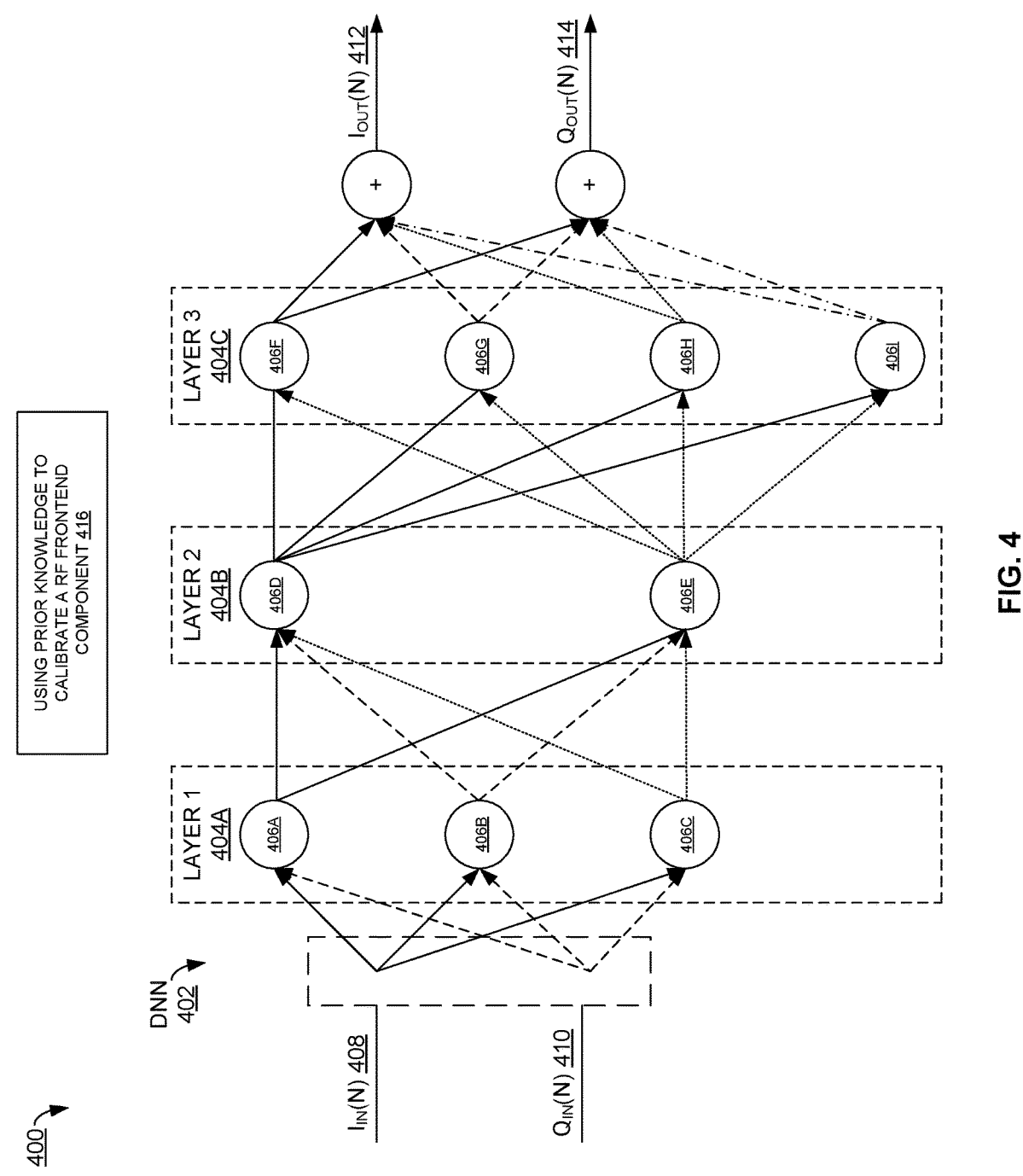
FIG. 4 illustrates an example system architecture for a deep neural network (DNN) to model RF frontend distortions that can facilitate the use of prior knowledge to calibrate a RF frontend in base stations, in accordance with an embodiment of this disclosure.

FIG. 4 illustrates an example system architecture 400 for a deep neural network (DNN) to model RF frontend distortions that can facilitate use of prior knowledge to calibrate a RF frontend in base stations, in accordance with an embodiment of this disclosure. In some examples, part(s) of system architecture 400 can be used to implement part(s) of system architecture 100 of FIG. 1 to facilitate the use of prior knowledge to calibrate an RF frontend in base stations.

System architecture 400 comprises DNN 402, layer 1 404A, layer 2 404B, layer 3 404C, neuron 406A, neuron 406B, neuron 406C, neuron 406D, neuron 406E, neuron 406F, neuron 406G, neuron 406H, neuron 406I, $I_{in}(n)$ 408, $Q_{in}(n)$ 410, $I_{out}(n)$ 412, $Q_{out}(n)$ 414, and the use of prior knowledge to calibrate a RF frontend in base stations component 416 (which can be similar to use of prior knowledge to calibrate a RF frontend component 108 of FIG. 1).

The number of layers and neurons per layer in system architecture 400 is for example purposes, and it can be appreciated that there can be examples with different numbers of layers and/or numbers of neurons in each layer.

This set of weights can then be used for initialization of other RF boards such that no further training is required to be done separately on these boards. As can be appreciated by one skilled in the art, it can be that such a transfer cannot be trivially done by just copying the model and coefficients for compensation of RF impairments of such boards, but rather can be done using techniques presented here. Computationally, therefore this can end up being a cheaper solution for calibration of RF boards when volume production can be required and without being overly concerned due to manufacturing variability or other sources of deviations.

Figure 5:
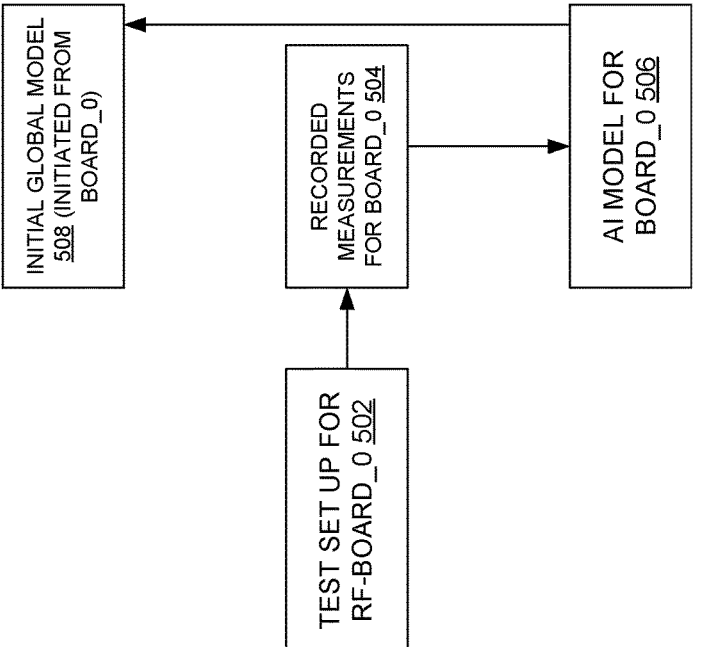
FIG. 5 illustrates a system architecture for a RF machine learning (ML) self-initialization that can facilitate the use of prior knowledge to calibrate a RF frontend in base stations, in accordance with an embodiment of this disclosure.

FIG. 5 illustrates a system architecture 500 for a RF ML self-optimization that can facilitate the use of prior knowledge to calibrate an RF frontend in base stations, in accordance with an embodiment of this disclosure. In some examples, part(s) of system architecture 500 can be used to implement part(s) of system architecture 100 of FIG. 1 to facilitate the use of prior knowledge to calibrate a RF frontend in base stations.

System architecture 500 comprises test set up for RF-Board_0 502, recorded measurements for Board_0 504, AI model for Board_0 506, and initial global model 508 (initiated from Board_0).

Another example of a task can relate to a NN-based architecture to predict energy levels of future subframes to adjust PA bias level proactively. PA bias optimization can be a fundamental task for superior RF performance that takes a finite amount of time due to non-zero rise and fall times of RF circuitry and the power amplifier itself. Thus, ensuring optimal bias levels when the power levels of the input signal keep varying, which can under bursty traffic conditions using an orthogonal frequency-division multiplexing (OFDM) signal, for example, tend to be challenging. AI/ML-based prediction techniques can be useful under these conditions to predict the power levels of the transmitted signal using appropriate training data and thus ensure an optimal bias level for the PA These and other model trainings for a test board (Board_0) can be depicted in system architecture 500 and can comprise the source domain. These examples can further maintain a global model that can be initiated by AI/ML model for RF impairment compensation for Board_0. Some prior ML approaches can assume that the source domain and target domain exhibit the same characteristics. However, the present techniques can relate to looking at cases where this is not a requirement, so it can be that direct model transfer is not a workable solution.

Figure 6:
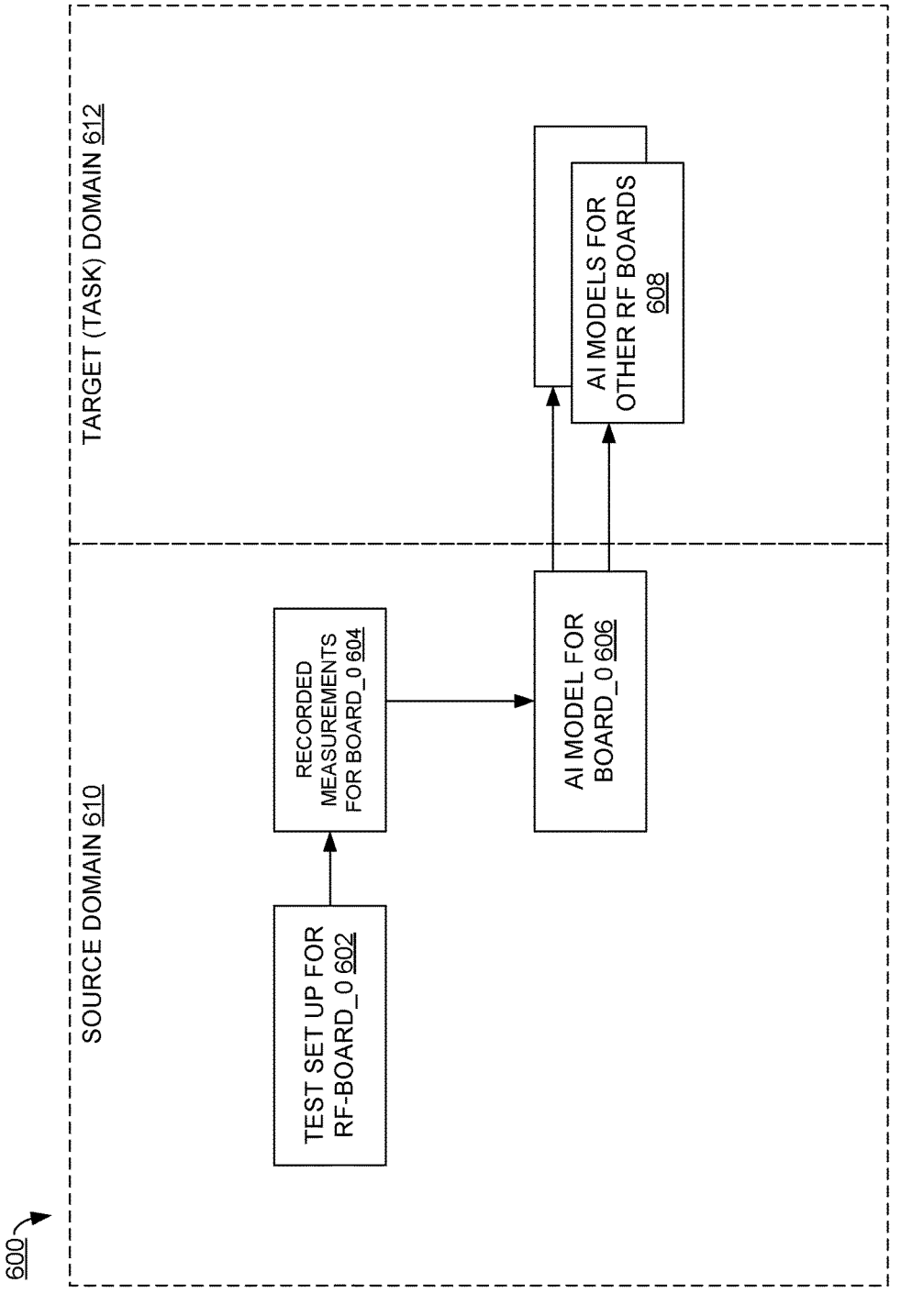
FIG. 6 illustrates an example system architecture for model transfer of a RF ML model that can facilitate use of prior knowledge to calibrate a RF frontend in base stations, in accordance with an embodiment of this disclosure.

FIG. 6 illustrates an example system architecture 600 for model transfer of an RF AI/ML model that can facilitate the use of prior knowledge to calibrate a RF frontend in base stations, in accordance with an embodiment of this disclosure. In some examples, part(s) of system architecture 600 can be used to implement part(s) of system architecture 100 of FIG. 1 to facilitate the use of prior knowledge to calibrate an RF frontend in base stations.

System architecture 600 comprises test set up for RF-Board_0 602, recorded measurements for Board_0 604, AI model for Board_0 606, AI models for other RF boards 608, source domain 610, and target (task) domain 612.

AI/ML model transfer to other boards can be implemented. Variations in RF frontend behavior due to hardware and channel effects can render a direct transfer of the AI model from Board_0 ineffective. Since the RF boards can perform similar tasks as Board_0, a task similarity can be taken advantage of in transferring the learned model of Board_0 to the other boards. Domain adaptation can be used in achieving this. To complement this learning a covariance shift can be utilized, as training can be restricted by a size of the data set available in the source domain for the training. A covariance shift can be used, for example, when the source domain and target domain have the same input space X, output space Y and share the same conditional distributions of Y, but different marginal distributions of X. More formally it can be expressed as follows, $$P_S(y \mid x) = P_T(y \mid x),$$

but $$P_S(x) \neq P_T(x)$$

Furthermore, this framework can accommodate both environmental change, e.g., different channel conditions and platform change such as different RF hardware.

Figure 7:
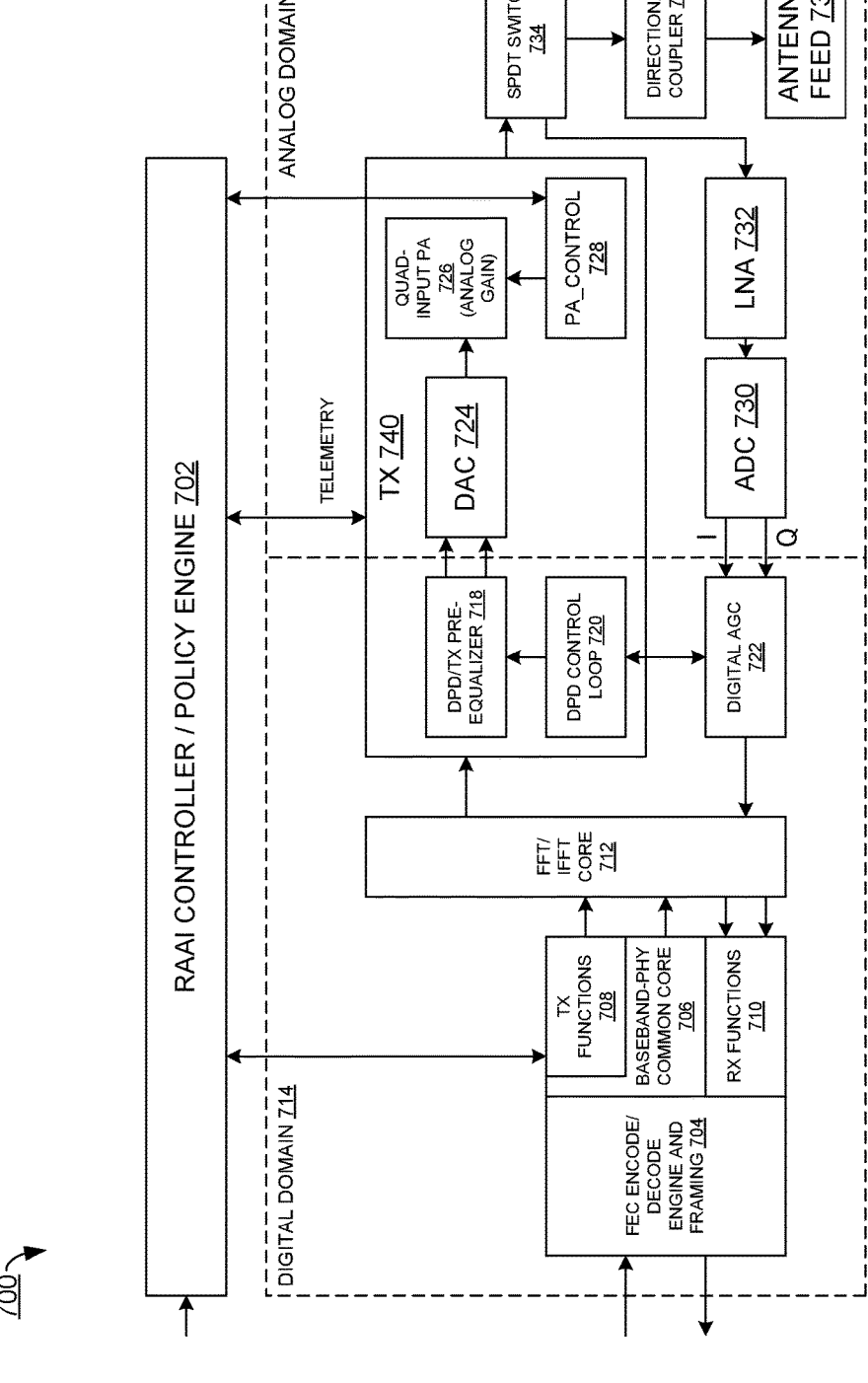
FIG. 7 illustrates an example system architecture for an open radio access network (O-RAN) with added telemetry points and local learning of an AI/ML model that can facilitate use of prior knowledge to calibrate a RF frontend in base stations, in accordance with an embodiment of this disclosure.

FIG. 7 illustrates an example system architecture 700 for an O-RAN with added telemetry points and local learning of an AI/ML model that can facilitate use of prior knowledge to calibrate a RF frontend in base stations, in accordance with an embodiment of this disclosure. In some examples, part(s) of system architecture 700 can be used to implement part(s) of system architecture 100 of FIG. 1 to facilitate the use of prior knowledge to calibrate a RF frontend in base stations.

System architecture 700 comprises the basic blocks of a radio and the physical layer modules that feed into it to enable the concept of radio as an instrument (RAAI) and its associated controller/policy engine 702. Accordingly, system architecture 700 comprises forward error correction (FEC) encode/decode engine and framing 704, baseband-physical (PHY) common core 706, Tx functions 708, fast Fourier transform (FFT)/inverse FFT (IFFT) core 712, digital domain 714, analog domain 716, digital pre-distortion (DPD)/Tx pre-equalizer 718, DPD control loop 720, digital-audio-converter (DAC) 724, quad-input PA 726 (analog gain), PA control 728 within Tx 740 for the transmit path and digital automatic gain control (AGC) 722, analog-to-digital converter (ADC) 730, low-noise amplifier (LNA) 732, split path double throw (SPDT) switch 734, directional coupler 736, antenna feed 738, and Rx functions 710 in the receive path.

Local learning at each RU can be implemented as follows. System architecture 700 can depict blocks in a RU, along with additional blocks that can be upstream (e.g., physical layer signal processing) and downstream (e.g., antenna feed) from the core radio processing unit as the functional behavior of these blocks can influence how the RF signal can be processed. In particular, there can be baseband common physical core (PHY CORE) modules that have common functionality such as FFT/IFFT processing, transmit and receive signal gain control, and the like, with certain functions that can be specific to downlink and uplink signal processing respectively. Local learning for the AI/ML models at each RU can be controlled by a RAAI controller (702) as shown in system architecture 700.

In system architecture 700, an overall policy engine can be fed through various telemetry points.

Locally collected RF statistics can be used to update model coefficients only (in some examples, no model structural updates are to be done online as the computational power required to recompute such coefficients may not exist). For example, the local data can be used to update transmit pre-equalization coefficients or the prediction engine for sleep modes.

Example Process Flows

FIG. 8 illustrates an example process flow 800 that can facilitate the use of prior knowledge to calibrate a RF frontend in base stations, in accordance with an embodiment of this disclosure. In some examples, one or more embodiments of process flow 800 can be implemented by use of prior knowledge to calibrate a RF frontend component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts, as part of initially deploying a second radio frequency transceiver, transferring, by a system, a core model to the second radio frequency transceiver, the core model having been trained based on a training process comprising training an artificial intelligence model for a first radio frequency transceiver, based on first data that is measured for the first radio frequency transceiver, wherein the core model identifies a number of layers and respective numbers of neurons for respective layers of the number of layers, and wherein the core model is transferred independent of identifying interconnections and coefficients.

In some examples, transferring the core model to the second radio frequency transceiver comprises copying learned weights of the core model and copying the core model from the first radio frequency transceiver to the second radio frequency transceiver. That is, the learned weights of a pre-processing NN architecture can be transferred, along with the NN model itself.

In some examples, transferring the core model to the second radio frequency transceiver is performed based on the second radio frequency transceiver being powered on before carrying live traffic. That is, this can be part of initial setup of a new transceiver, and can be performed at a modem bootup and calibration stage, when a RF board is first powered up for calibration.

In some examples, training the artificial intelligence model for the first radio frequency transceiver was performed based on generating a group of data sets by varying radio frequency-platform specific parameters, while holding system-related parameters constant, and by varying values of the group of data sets within a target operational signal-to-noise ratio. That is, in training in the source domain, multiple data sets can be generated by varying (RF) platform specific parameters (e.g., FO, IQ skew values (within tolerance spec.)) while keeping system related parameters constant (e.g., signal bandwidth, modulation order, and calibrated PA bias). These data sets can be varied within a target operational SNR with, e.g., a +/−5% variation to account for variation in thermal noise.

After operation 804, process flow 800 moves to operation 806.

Operation 806 depicts applying transfer learning on the core model at the second radio frequency transceiver based on second data that is measured for the second radio frequency transceiver, to produce a trained model, wherein the trained model comprises the number of layers, the respective numbers of neurons for respective layers of the number of layers, the interconnections, and the coefficients. That is, after transferring the model to another transceiver board, the transferred model can be trained locally at the new board.

In some examples, the artificial intelligence model is trained using fully-supervised learning with first labeled data, and transfer learning on the core model is performed using partially-supervised learning with second labeled data and part of the first data. That is, RF model transfer can incorporate an availability of labeled data in both source and target domains.

In some examples, the transfer learning is applied on the core model for updating coefficients of the trained model while holding a structure of the core model constant in the trained model. That is, locally-collected RF statistics can be used to update model coefficients, without updating model structure online.

After operation 806, process flow 800 moves to operation 808.

Operation 808 depicts calibrating the second radio frequency transceiver based on an output of the trained model to produce a calibrated second radio frequency transceiver. That is, the second transceiver board can then self-calibrate using the model that has now been locally trained.

In some examples, a group of radio frequency transceivers comprises the second radio frequency transceiver, the output is a first output, and operations 804-908 comprise transferring respective copies of the core model to respective radio frequency transceivers of the group of radio frequency transceivers, applying respective transfer learning on the respective copies of the core model at the respective radio frequency transceivers based on respective data that is measured for the respective radio frequency transceivers, to produce respective trained model, calibrating the respective radio frequency transceivers based on respective outputs of the respective trained model to produce respective calibrated radio frequency transceivers. This can be similar to the example of FIG. 2, where AI model for Board_0 212 can be transferred to multiple boards with AI model for RF-Boards 218, where the respective boards can be locally trained and used to calibrate transceivers.

After operation 808, process flow 800 moves to operation 810.

Operation 810 depicts transmitting radio frequency information via the calibrated second radio frequency transceiver. That is, with a calibrated transceiver communications via wireless signals can be sent and received.

After operation 810, process flow 800 moves to 812, where process flow 800 ends.

FIG. 9 illustrates an example process flow 900 that can facilitate the use of prior knowledge to calibrate a RF frontend in base stations, in accordance with an embodiment of this disclosure. In some examples, one or more embodiments of process flow 900 can be implemented by use of prior knowledge to calibrate a RF frontend component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts, as part of initially deploying a second transceiver, transferring a core model to the second transceiver, the core model having been trained, based on first data that is measured for a first transceiver, using an artificial intelligence model for the first transceiver, wherein the core model identifies a number of layers and respective numbers of neurons for respective layers of the number of layers. In some examples, operation 904 can be implemented in a similar manner as operation 804 of FIG. 8.

In some examples, using the artificial intelligence model comprises using first labeled training data, wherein performing the transfer learning using the core model comprises performing the transfer learning with second labeled training data, and wherein the first labeled training data differs from the second labeled training data.

After operation 904, process flow 900 moves to operation 906.

Operation 906 depicts performing transfer learning on the core model at the second transceiver based on second data that is measured for the second transceiver, to produce a trained model. In some examples, operation 906 can be implemented in a similar manner as operation 806 of FIG. 8.

In some examples, a first behavior of the first transceiver differs from a second behavior of the second transceiver based on differing hardware effects and channel effects. That is, transfer learning can be applied where variations in RF frontend behavior due to hardware and channel effects render a direct transfer of an AI model ineffective.

In some examples, a first behavior of the first transceiver differs from a second behavior of the second transceiver based on a first channel condition of the first transceiver differing from a second channel condition of the second transceiver, or based on a first hardware configuration of the first transceiver differing from a second hardware configuration of the second transceiver. That is, transceivers can exist in different environmental conditions, and also have different channel conditions and platform differences, such as different RF hardware.

In some examples, performing the transfer learning on the core model at the second transceiver based on second data that is measured for the second transceiver, to produce the trained model comprises updating coefficients of the core model in the trained model while holding a structure of the core model constant in the trained model.

After operation 906, process flow 900 moves to operation 908.

Operation 908 depicts calibrating the second transceiver based on an output of the trained model to produce a calibrated second transceiver. In some examples, operation 908 can be implemented in a similar manner as operation 808 of FIG. 8.

In some examples, calibrating the second transceiver comprises adjusting a transmit output power, an energy efficiency, a skew, or a frequency offset of the second transceiver. It can be calibrating can comprise an RF optimization related to metrics such as transmit output power, energy efficiency, skew, and FO mitigation.

After operation 908, process flow 900 moves to operation 910.

Operation 910 depicts transmitting information via the calibrated second transceiver. In some examples, operation 910 can be implemented in a similar manner as operation 810 of FIG. 8.

After operation 910, process flow 900 moves to 912, where process flow 900 ends.

FIG. 10 illustrates an example process flow 1000 that can facilitate the use of prior knowledge to calibrate a RF frontend in base stations, in accordance with an embodiment of this disclosure. In some examples, one or more embodiments of process flow 1000 can be implemented by use of prior knowledge to calibrate an RF frontend component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, and/or process flow 1000 of FIG. 10.

Process flow 1000 begins with 1002, and moves to operation 1004.

Operation 1004 depicts training a model for a first transceiver, based on first data that is measured for the first transceiver, to produce a core model. In some examples, operation 1004 can be implemented in a similar manner as operation 804 of FIG. 8.

After operation 1004, process flow 1000 moves to operation 1006.

Operation 1006 depicts transferring the core model to a second transceiver. In some examples, operation 1006 can be implemented in a similar manner as operation 804 of FIG. 8.

After operation 1006, process flow 1000 moves to operation 1008.

Operation 1008 depicts performing transfer learning on the core model at the second transceiver based on second data that is measured for the second transceiver, to produce a trained model. In some examples, operation 1008 can be implemented in a similar manner as operation 806 of FIG. 8.

In some examples, operation 1008 comprises modifying coefficients in the trained model while holding constant a structure of the trained model.

After operation 1008, process flow 1000 moves to operation 1010.

Operation 1010 depicts calibrating the second transceiver based on an output of the trained model to produce a calibrated second transceiver. In some examples, operation 1010 can be implemented in a similar manner as operation 808 of FIG. 8.

In some examples, operation 1010 comprises transmitting information via the calibrated second transceiver.

In some examples, operation 1010 comprises adjusting at least one of a transmit output power of the second transceiver, an energy efficiency of the second transceiver, a skew of the second transceiver, or a frequency offset of the second transceiver.

In some examples, the output of the trained model is a first output of the trained model, and operation 1010 comprises updating the trained model based on a physical change to a radio that comprises the second transceiver, to produce an updated trained model, re-calibrating the second transceiver based on a second output of the trained model to produce an updated calibrated second transceiver. That is, a transferred model can be repeatedly updated over time, based on prevailing conditions of the radio, and the updated model can then be used to recalibrate the radio.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

In some examples, computing environment 1100 can implement one or more embodiments of the process flows of FIGS. 8-10 to facilitate the use of prior knowledge to calibrate a RF frontend in base stations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

FIG. 11 illustrates an example block diagram 1100 of a computer operable to execute an embodiment of this disclosure.

Core network 1108 can comprise components of a third generation (3G), fourth generation (4G), long term evolution (LTE), 5G, or other, wireless communication network. Core network 1108 can be configured to establish connectivity between a UE and a communications network (such as the Internet), such as through facilitating services such as connectivity and mobility management, authentication and authorization, subscriber data management, and policy management. Messages sent between a UE and a communications network can propagate through CU 1110, DU 1112, RU 1114, and antenna 1116.

CU 1110 can be configured to process non-real-time radio resource control (RRC) and packet data convergence protocol (PDCP) communications. DU 1112 can be configured to process communications transmitted according to radio link control (RLC), medium access control (MAC), and PHY layers. RU 1114 can be configured to convert radio signals sent to antenna 1116 from digital packets to radio signals, and convert radio signals received from antenna 1116 from radio signals to digital packets. Antenna 1116 (which can comprise a transceiver) can be configured to send and receive radio waves that are used to convey information.

CONCLUSION

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, optical disk storage, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   as part of initially deploying a second radio frequency transceiver, transferring, by a system, a core model to the second radio frequency transceiver, the core model having been trained based on a training process comprising training an artificial intelligence model for a first radio frequency transceiver, based on first data that is measured for the first radio frequency transceiver, wherein the core model identifies a number of layers and respective numbers of neurons for respective layers of the number of layers, and wherein the core model is transferred independent of identifying interconnections and coefficients;

applying, by the system, transfer learning on the core model at the second radio frequency transceiver based on second data that is measured for the second radio frequency transceiver, to produce a trained model, wherein the trained model comprises the number of layers, the respective numbers of neurons for respective layers of the number of layers, the interconnections, and the coefficients;

calibrating, by the system, the second radio frequency transceiver based on an output of the trained model to produce a calibrated second radio frequency transceiver; and transmitting, by the system, radio frequency information via the calibrated second radio frequency transceiver.

2. The method of claim 1, wherein a group of radio frequency transceivers comprises the second radio frequency transceiver, wherein the output is a first output, and further comprising:
   transferring, by the system, respective copies of the core model to respective radio frequency transceivers of the group of radio frequency transceivers;
   applying, by the system, respective transfer learning on the respective copies of the core model at the respective radio frequency transceivers based on respective data that is measured for the respective radio frequency transceivers, to produce respective trained models; and
   calibrating, by the system, the respective radio frequency transceivers based on respective outputs of the respective trained model to produce respective calibrated radio frequency transceivers.

3. The method of claim 1, wherein transferring the core model to the second radio frequency transceiver comprises:
   copying, by the system, learned weights of the core model and copying the core model from the first radio frequency transceiver to the second radio frequency transceiver.

4. The method of claim 1, wherein transferring the core model to the second radio frequency transceiver is performed based on the second radio frequency transceiver being powered on before carrying live traffic.

5. The method of claim 1, wherein training the artificial intelligence model for the first radio frequency transceiver was performed based on generating a group of data sets by varying radio frequency-platform specific parameters, while holding system-related parameters constant, and by varying values of the group of data sets within a target operational signal-to-noise ratio.

6. The method of claim 5, wherein the radio frequency-platform specific parameters comprise frequency offset or quadrature-phase skew, and wherein the system-related parameters comprise signal bandwidth, modulation order, or calibrated power amplifier bias.

7. The method of claim 1, wherein the artificial intelligence model is trained using fully-supervised learning with first labeled data, and transfer learning on the core model is performed using partially-supervised learning with second labeled data and part of the first data.

8. The method of claim 1, wherein the transfer learning is applied on the core model to update coefficients of the trained model while holding a structure of the core model constant in the trained model.

9. A system, comprising:
   a processor; and
   a memory coupled to the processor, comprising instructions that, in response to execution by the processor, cause the system to perform operations, comprising:

as part of initially deploying a second transceiver, transferring a core model to the second transceiver, the core model having been trained, based on first data that is measured for a first transceiver, using an artificial intelligence model for the first transceiver, wherein the core model identifies a number of layers and respective numbers of neurons for respective layers of the number of layers;

performing transfer learning on the core model at the second transceiver based on second data that is measured for the second transceiver, to produce a trained model;

calibrating the second transceiver based on an output of the trained model to produce a calibrated second transceiver; and transmitting information via the calibrated second transceiver.

10. The system of claim 9, wherein using the artificial intelligence model comprises using first labeled training data, wherein performing the transfer learning using the core model comprises performing the transfer learning with second labeled training data, and wherein the first labeled training data differs from the second labeled training data.

11. The system of claim 9, wherein a first behavior of the first transceiver differs from a second behavior of the second transceiver based on differing hardware effects and channel effects.

12. The system of claim 9, wherein a first behavior of the first transceiver differs from a second behavior of the second transceiver based on a first channel condition of the first transceiver differing from a second channel condition of the second transceiver, or based on a first hardware configuration of the first transceiver differing from a second hardware configuration of the second transceiver.

13. The system of claim 9, wherein performing the transfer learning on the core model at the second transceiver based on second data that is measured for the second transceiver, to produce the trained model comprises:

updating coefficients of the core model in the trained model while holding a structure of the core model constant in the trained model.

14. The system of claim 9, wherein calibrating the second transceiver comprises:

adjusting a transmit output power, an energy efficiency, a skew, or a frequency offset of the second transceiver.

15. A non-transitory computer-readable medium comprising instructions that, in response to execution, cause a system comprising a processor to perform operations, comprising:

as part of initially deploying a second transceiver, transferring a core model to the second transceiver, the core model having been trained, based on first data that is measured for a first transceiver, using an artificial intelligence model for the first transceiver, wherein the core model identifies a number of layers and respective numbers of neurons for respective layers of the number of layers;

performing transfer learning on the core model at the second transceiver based on second data that is measured for the second transceiver, to produce a trained model; and calibrating the second transceiver based on an output of the trained model to produce a calibrated second transceiver; and transmitting information via the calibrated second transceiver.

16. The non-transitory computer-readable medium of claim 15, wherein calibrating the second transceiver comprises:

adjusting at least one of a transmit output power of the second transceiver, an energy efficiency of the second transceiver, a skew of the second transceiver, or a frequency offset of the second transceiver.

17. The non-transitory computer-readable medium of claim 15, wherein performing transfer learning on the core model at the second transceiver comprises:

modifying coefficients in the trained model while holding constant a structure of the trained model.

18. The non-transitory computer-readable medium of claim 15, wherein performing the transfer learning on the core model at the second transceiver based on second data that is measured for the second transceiver, to produce the trained model is performed based on a quantized neural network architecture that utilizes L-bit representations for data and Q-bit representations for weight.

19. The non-transitory computer-readable medium of claim 15, wherein the output of the trained model is a first output of the trained model, and wherein the operations further comprise:

updating the trained model based on a physical change to a radio that comprises the second transceiver, to produce an updated trained model; and re-calibrating the second transceiver based on a second output of the trained model to produce an updated calibrated second transceiver.

20. The non-transitory computer-readable medium of claim 15, wherein a group of transceivers comprises the second transceiver, wherein the output is a first output, and further comprising: transferring, by the system, respective copies of the core model to respective transceivers of the group of transceivers; applying, by the system, respective transfer learning on the respective copies of the core model at the respective transceivers based on respective data that is measured for the respective transceivers, to produce respective trained models; and calibrating, by the system, the respective transceivers based on respective outputs of the respective trained model to produce respective calibrated transceivers.

* * * * *